(12) United States Patent
Liu et al.

(10) Patent No.: US 11,475,721 B2
(45) Date of Patent: Oct. 18, 2022

(54) METHOD FOR PERFORMING VEHICLE REMOTE DIAGNOSIS AND RELATED DEVICES

(71) Applicant: LAUNCH TECH CO., LTD., Shenzhen (CN)

(72) Inventors: Jun Liu, Shenzhen (CN); Zhijian Chen, Shenzhen (CN)

(73) Assignee: LAUNCH TECH CO., LTD., Shenzhen (CN)

( * ) Notice: Subject to any disclaimer, the term of this patent is extended or adjusted under 35 U.S.C. 154(b) by 515 days.

(21) Appl. No.: 16/678,017

(22) Filed: Nov. 8, 2019

(65) Prior Publication Data

US 2021/0065474 A1 Mar. 4, 2021

Related U.S. Application Data

(63) Continuation of application No. PCT/CN2019/104025, filed on Sep. 2, 2019.

(51) Int. Cl.
*H04L 29/08* (2006.01)
*G07C 5/08* (2006.01)
(Continued)

(52) U.S. Cl.
CPC .......... *G07C 5/0808* (2013.01); *G07C 5/008* (2013.01); *G07C 5/0841* (2013.01);
(Continued)

(58) Field of Classification Search
CPC .... G07C 5/0808; G07C 5/008; G07C 5/0841; G07C 2205/02; H04L 12/4015;
(Continued)

(56) References Cited

U.S. PATENT DOCUMENTS 8,705,527 B1 * 4/2014 Addepalli ......... H04W 52/0219
370/389
9,277,370 B2 * 3/2016 Addepalli ............. H04W 40/20
(Continued)

FOREIGN PATENT DOCUMENTS

CN 104850113 A 8/2015
CN 105745939 A 7/2016
(Continued)

OTHER PUBLICATIONS

Johanson M et al: "Relaying Controller Area Network Frames over Wireless Internetworks for Automotive Testing Applications", Systems and Networks Communications, 2009. ICSNC'09. Fourth International Conference On, IEEE, Piscataway, NJ, USA, Sep. 20, 2009 (Sep. 20, 2009), pp. 1-5, XP031541895, ISBN: 978-1-4244-4772-5, the whole document.
(Continued)

*Primary Examiner* — Jay P Patel
(74) *Attorney, Agent, or Firm* — Hauptman Ham, LLP (57) ABSTRACT

A method for performing vehicle remote diagnosis is provided. A diagnostic device sends a first controller area network (CAN) bus message to a device connector. The device connector encapsulates the first CAN bus message received into a first data packet and sends the first data packet to a vehicle connector through remote communication. The vehicle connector decapsulates the first data packet into the first CAN bus message and sends the first CAN bus message to a target vehicle. The vehicle connector receives second CAN bus messages and filters the second CAN bus messages to obtain a CAN bus diagnostic message, and the second CAN bus messages are sent by the target vehicle in response to the first CAN bus message. The vehicle connector encapsulates the CAN bus diagnostic message into a
(Continued)

second data packet and sends the second data packet to the device connector.

16 Claims, 5 Drawing Sheets

(51) Int. Cl.
    *G07C 5/00*      (2006.01)
    *H04L 67/104*      (2022.01)
    *H04L 12/40*      (2006.01)

(52) U.S. Cl.
    CPC ........ *H04L 12/4015* (2013.01); *H04L 67/104* (2013.01); *H04L 2012/40215* (2013.01); *H04L 2012/40273* (2013.01); *H04L 2212/00* (2013.01)

(58) Field of Classification Search
    CPC ......... H04L 67/104; H04L 2012/40215; H04L 2012/40273; H04L 2212/00; H04L 67/12; H04L 67/025
    See application file for complete search history.

(56) References Cited

U.S. PATENT DOCUMENTS

| | | | |
|---|---|---|---|
| 10,103,901 B2* | 10/2018 | Wu | H04L 12/1881 |
| 2005/0267655 A1 | 12/2005 | Gessner | |
| 2007/0121641 A1* | 5/2007 | Hovey | H04L 67/12 709/227 |
| 2008/0114920 A1* | 5/2008 | Watanabe | H04L 12/40032 710/316 |
| 2012/0143977 A1 | 6/2012 | Miche et al. | |
| 2013/0201316 A1* | 8/2013 | Binder | H04L 67/12 701/2 |
| 2014/0215491 A1* | 7/2014 | Addepalli | H04L 63/0227 719/313 |
| 2015/0029987 A1* | 1/2015 | Addepalli | G06F 3/017 370/329 |
| 2015/0373158 A1* | 12/2015 | Kim | H04L 12/40189 709/223 |
| 2016/0179737 A1* | 6/2016 | Brouwer | H04L 12/40189 710/104 |
| 2016/0358477 A1* | 12/2016 | Ansari | B60W 30/12 |
| 2017/0054574 A1* | 2/2017 | Wu | H04L 12/4641 |
| 2018/0225891 A1* | 8/2018 | Lambourne | H01R 13/6397 |
| 2018/0317067 A1* | 11/2018 | Ameixieira | H04W 76/10 |
| 2019/0026962 A1* | 1/2019 | Gintz | G07C 5/008 |
| 2019/0045034 A1* | 2/2019 | Alam | H04L 67/303 |
| 2019/0205115 A1* | 7/2019 | Gomes | H04W 4/50 |
| 2020/0193739 A1* | 6/2020 | Gintz | G07C 5/008 |
| 2020/0202645 A1* | 6/2020 | Gintz | G07C 5/0825 |
| 2020/0219335 A1* | 7/2020 | Gintz | G06F 9/4411 |
| 2020/0294401 A1* | 9/2020 | Kerecsen | G05D 1/0287 |
| 2021/0203682 A1* | 7/2021 | Bajpai | G06F 21/55 |

FOREIGN PATENT DOCUMENTS

| | | |
|---|---|---|
| CN | 207096803 U | 3/2018 |
| FR | 2812437 A1 | 2/2002 |
| JP | 2002331884 A | 11/2002 |
| WO | 2015075342 A1 | 5/2015 |

OTHER PUBLICATIONS

The Extended European Search Report issued corresponding EP Application No. EP 19797971.9, dated Jun. 11, 2021, pp. 1-11.
International Search Report issued in International Application No. PCT/CN2019/104025, dated May 27, 2020, pp. 1-4, National Intellectual Property Administration, Beijing, China.

* cited by examiner

METHOD FOR PERFORMING VEHICLE REMOTE DIAGNOSIS AND RELATED DEVICES

CROSS-REFERENCE TO RELATED APPLICATION(S)

This application is a continuation of PCT application No. PCT/CN2019/104025, filed on Sep. 2, 2019, the disclosure of which is hereby incorporated by reference in its entireties.

TECHNICAL FIELD

The present disclosure relates to the field of internet of vehicles, and particularly to a method for performing remote diagnosis and related devices.

BACKGROUND

With the development of the vehicle industry, modern electronic control technology has penetrated into various components of a vehicle, a structure of the vehicle has become more and more complex, and a degree of automation has become higher and higher, such that it is more and more difficult for performing vehicle fault diagnosis.

Currently, the vehicle is diagnosed and programmed by being coupled to an external diagnostic device via on-board diagnostics (OBD). At present, diagnoses based on the controller area network (CAN) bus are widely used, but diagnoses and programs for the vehicle can only be performed within a limited distance, and thus it is not convenient to diagnose and program the vehicle. How to realize convenient and efficient diagnosis for vehicles is a hot issue in this field.

SUMMARY

Embodiments of the present disclosure provide a method for performing vehicle remote diagnosis and related devices, which solves a problem in the related art that a vehicle can only be diagnosed and programed within a limited distance and it is inconvenient to diagnose and program the vehicle, thereby realizing convenient and efficient diagnosis for the vehicle.

According to a first aspect of the present disclosure, a method for performing vehicle remote diagnosis is provided. The method is applicable to a remote diagnostic system, and the remote diagnostic system includes a diagnostic device, a device connector, and a vehicle connector. The method is carried out as follows.

The diagnostic device sends a first controller area network (CAN) bus message to the device connector. The device connector encapsulates the first CAN bus message received into a first data packet and sends the first data packet to the vehicle connector through remote communication. The vehicle connector decapsulates the first data packet into the first CAN bus message and sends the first CAN bus message to an electronic control unit of a target vehicle, and the vehicle connector and the target vehicle perform a CAN bus connection via a CAN. The vehicle connector receives second CAN bus messages and filters the second CAN bus messages to obtain a CAN bus diagnostic message, and the second CAN bus messages are sent by the electronic control unit of the target vehicle in response to the first CAN bus message. The vehicle connector encapsulates the CAN bus diagnostic message into a second data packet and sends the second data packet to the device connector via the remote communication. The device connector decapsulates the second data packet into the CAN bus diagnostic message and sends the CAN bus diagnostic message to the diagnostic device. The diagnostic device analyzes and processes the CAN bus diagnostic message to obtain a diagnostic result, and presents the diagnostic result to a user.

In the above-mentioned method, the target vehicle is coupled with the vehicle connector, the device connector is coupled with the diagnostic device, and the vehicle connector and the device connector can communicate with each other through a network. The second CAN bus messages received from the electronic control unit of the target vehicle is filtered to obtain the CAN bus diagnostic message related to a diagnosis. In this way, a problem in the related art that diagnoses and programs for a vehicle can only be performed within a limited distance and the diagnoses and programs for the vehicle are inconvenient is solved, such that remote communication between the target vehicle and the diagnostic device is realized, data related to a vehicle diagnosis can be accurately received, and the communication efficiency is improved.

According to a second aspect of the present disclosure, a method for performing vehicle remote diagnosis is provided. The method is applicable to a device connector and is carried out as follows.

A first CAN bus message sent by a diagnostic device is received. The first CAN bus message received is encapsulated into a first data packet and the first data packet is sent to a vehicle connector through remote communication. The first data packet is decapsulated by the vehicle connector into the first CAN bus message and then the first CAN bus message is sent by the vehicle connector to an electronic control unit of a target vehicle. The vehicle connector and the target vehicle perform a CAN bus connection via a CAN. A second data packet sent by the vehicle connector through the remote communication is received, the second data packet is obtained by encapsulating a CAN bus diagnostic message by the vehicle connector, and the CAN bus diagnostic message is obtained by filtering second CAN bus messages by the vehicle connector, the second CAN bus messages are sent by the electronic control unit of the target vehicle to the vehicle connector in response to the first CAN bus message. The device connector decapsulates the second data packet into the CAN bus diagnostic message and sends the CAN bus diagnostic message to the diagnostic device. The CAN bus diagnostic message is analyzed and processed by the diagnostic device to obtain a diagnostic result, and the diagnostic result is presented to a user by the diagnostic device.

In the above-mentioned method, the device connector receives the first CAN bus message sent by the diagnostic device, parses the first CAN bus message into the first data packet, and sends the first data packet to the vehicle connector. The device connector receives the CAN bus diagnostic message sent by the vehicle connector and sends the CAN bus diagnostic message to the diagnostic device. In this way, the remote diagnosis for a target vehicle is achieved.

In an optional implementation according to the second aspect, the method further includes the following prior to receiving the first CAN bus message sent by the diagnostic device.

Vehicle type information of the target vehicle is obtained. A CAN bus termination resistor is configured according to CAN bus configuration information corresponding to the vehicle type information. A CAN bus connection with the diagnostic device is performed.

In this implementation, the CAN bus termination resistor of the device connector is configured according to the vehicle type information of the target vehicle obtained, and then the CAN bus connection with the diagnostic device is performed. In this way, the CAN bus termination resistor can be configured more accurately, and the CAN bus connection with the diagnostic device can be performed more efficiently.

In an optional implementation according to the second aspect, the CAN bus connection with the diagnostic device is performed as follows.

A target CAN node is determined according to the CAN bus termination resistor configured. A CAN bus network is built by combining the target CAN node and a CAN node of the diagnostic device, and the CAN bus connection with the diagnostic device is performed.

In this implementation, the device connector and the diagnostic device are enabled to build the CAN bus network by configuring the CAN bus termination resistor in the device connector. Through the CANBUS bus network, the device connector receives the first CAN bus message sent by the diagnostic device and sends the CAN bus diagnostic message received to the diagnostic device. In this way, data interaction between the device connector and the diagnostic device is realized, and data communication through the CAN bus network has strong real-time, and is easy to implement and highly cost-effective.

In an optional implementation according to the second aspect, the remote communication includes server data forwarding, peer-to-peer (P2P) communication, and mobile communication.

In this implementation, multiple communication manners are adopted to enable the first data packet to be sent to the vehicle connector and the second data packet to be sent to the device connector, thereby causing data transmission more convenient.

According to a third aspect of the present disclosure, a method for performing vehicle remote diagnosis is provided. The method is applicable to a vehicle connector and carried out as follows.

A first data packet sent by a device connector through remote communication is received. The first data packet is obtained by encapsulating a first CAN bus message by the device connector, and the first CAN bus message is sent by a diagnostic device to the device connector. The first data packet is decapsulated into the first CAN bus message and the first CAN bus message is sent to an electronic control unit of a target vehicle. The vehicle connector and the target vehicle perform a CAN bus connection via a CAN. Second CAN bus messages are received, the second CAN bus messages are filtered to obtain a CAN bus diagnostic message, and the second CAN bus messages are sent by the electronic control unit of the target vehicle in response to the first CAN bus message. The CAN bus diagnostic message is encapsulated into a second data packet and the second data packet is sent to the device connector via the remote communication. The second data packet is decapsulated by the device connector into the CAN bus diagnostic message and the CAN bus diagnostic message is further sent by the device connector to the diagnostic device. The CAN bus diagnostic message is analyzed and processed by the diagnostic device to obtain a diagnostic result, and the diagnostic result is presented to a user by the diagnostic device.

In the above-mentioned method, the second CAN bus messages sent by the electronic control unit of the target vehicle is filtered to obtain the CAN bus diagnostic message. In this way, the vehicle connector can receive the CAN bus diagnostic message related to a diagnosis of the target vehicle more efficiently and send the CAN bus diagnostic message to the device connector, thereby improving the efficiency of the diagnosis of the target vehicle.

In an optional implementation according to the third aspect, the method further includes the following prior to filtering the second CAN bus messages to obtain the CAN bus diagnostic message.

Vehicle type information of the target vehicle is obtained. A CAN bus filter is configured according to CAN bus configuration information corresponding to the vehicle type information. A CAN bus connection with the target vehicle is performed.

In this implementation, the vehicle connector configures the CAN bus filter of the vehicle connector according to the vehicle type information of the target vehicle obtained. In this way, the CAN bus filter can be configured more accurately according to the vehicle type information of the target vehicle, and the CAN bus connection with the target vehicle is performed specifically.

According to an optional implementation of the third aspect, the second CAN bus messages are filtered to obtain the CAN bus diagnostic message as follows.

The second CAN bus messages are filtered to obtain the CAN bus diagnostic message according to the CAN bus filter.

In this implementation, the vehicle connector filters the second CAN bus messages sent by the electronic control unit of the target vehicle to obtain the CAN bus diagnostic message related to the diagnosis, thereby improving the efficiency of the diagnosis.

According to a fourth aspect of the present disclosure, a device connector is provided. The device connector includes a communicator and a processor.

The communicator is configured to receive a first CAN bus message sent by a diagnostic device. The processor is configured to encapsulate the first CAN bus message received into a first data packet and to send the first data packet to a vehicle connector via the communicator. The vehicle connector is configured to decapsulate the first data packet into the first CAN bus message and to send the first CAN bus message to an electronic control unit of a target vehicle, and then, the vehicle connector is further configured to receive second CAN bus messages which are sent by the electronic control unit of the target vehicle to the vehicle connector in response to the first CAN bus message and to filter the second CAN bus messages to obtain a CAN bus diagnostic message. The vehicle connector and the target vehicle perform a CAN bus connection via a CAN. The communicator is further configured to receive a second data packet sent by the vehicle connector, and the second data packet is obtained by encapsulating the CAN bus diagnostic message by the vehicle connector. The processor is further configured to decapsulate the second data packet into the CAN bus diagnostic message and to send the CAN bus diagnostic message to the diagnostic device according to the stored executable computer programs. The CAN bus diagnostic message is analyzed and processed by the diagnostic device to obtain a diagnostic result, and the diagnostic result is presented to a user by the diagnostic device.

In an optional implementation of the fourth aspect, the communicator is configured to obtain vehicle type information of the target vehicle. The processor is configured to configure a CAN bus termination resistor according to CAN bus configuration information corresponding to the vehicle type information and the stored executable computer programs. The communicator is further configured to perform a CAN bus connection with the diagnostic device.

In an optional implementation of the fourth aspect, the processor is configured to determine a target CAN node according to the CAN bus termination resistor configured and the stored executable computer programs. The communicator is configured to build a CAN bus network by combining the target CAN node and a CAN node of the diagnostic device, and to perform the CAN bus connection with the diagnostic device.

In an optional implementation of the fourth aspect, the communicator is configured to perform the remote communication via server data forwarding, peer-to-peer (P2P) communication, and mobile communication.

It can be noted that implementations and the corresponding beneficial effects of the fourth aspect can be referred to the second aspect and descriptions in corresponding implementations, and details are not described herein again.

According to a fifth aspect of the present disclosure, a vehicle connector is provided. The vehicle connector includes a communicator and a processor.

The communicator is configured to receive a first data packet sent by a device connector through remote communication. The first data packet is obtained by encapsulating a first CAN bus message by the device connector, and the first CAN bus message is sent by a diagnostic device to the device connector. A processor is configured to decapsulate the first data packet into the first CAN bus message and to send the first CAN bus message to an electronic control unit of a target vehicle according to stored executable computer programs, and the vehicle connector and the target vehicle perform a CAN bus connection via a CAN. The communicator is further configured to receive second CAN bus messages and to filter the second CAN bus messages to obtain a CAN bus diagnostic message, and the second CAN bus messages are sent by the electronic control unit of the target vehicle in response to the first CAN bus message. The processor is further configured to encapsulate the CAN bus diagnostic message into a second data packet and to send the second data packet to the device connector through the remote communication according to the stored executable computer programs, the second data packet is decapsulated by the device connector into the CAN bus diagnostic message and the CAN bus diagnostic message is further sent by the device connector to the diagnostic device, and the CAN bus diagnostic message is analyzed and processed by the diagnostic device to obtain a diagnostic result, and the diagnostic result is presented to a user by the diagnostic device.

In an implementation optional of the fifth aspect, the communicator is configured to obtain vehicle type information of the target vehicle. The processor is configured to configure a CAN bus filter according to CAN bus configuration information corresponding to the vehicle type information and the stored executable computer programs. The communicator is configured to perform a CAN bus connection with the target vehicle.

In an implementation of the fifth aspect, the processor is configured to filter the second CAN bus messages to obtain the CAN bus diagnostic message according to the CAN bus filter and the stored executable computer programs.

In an implementation of the fifth aspect, the communicator is configured to perform the remote communication via server data forwarding, peer-to-peer (P2P) communication, and mobile communication.

It can be noted that implementations and the corresponding beneficial effects of the fifth aspect can be referred to the third aspect and descriptions in corresponding implementations, and details are not described herein again.

BRIEF DESCRIPTION OF THE DRAWINGS

To describe the technical solutions in the embodiments of the present disclosure or the related art more clearly, the following briefly introduces the accompanying drawings used for describing the embodiments or the related art.

DETAILED DESCRIPTION OF ILLUSTRATED EMBODIMENTS

The embodiments of the present disclosure will be described hereinafter with reference to the accompanying drawings in the embodiments of the present disclosure.

The terms "first", "second", "third", "fourth", and the like used in the specification, the claims, and the accompany drawings of the present disclosure are used to distinguish different objects rather than describe a particular order. The terms "include", "comprise", and "have" as well as variations thereof are intended to cover non-exclusive inclusion. For example, a process, method, system, product, or apparatus including a series of steps or units is not limited to the listed steps or units, on the contrary, it can optionally include other steps or units that are not listed; alternatively, other steps or units inherent to the process, method, product, or device can be included either.

The term "embodiment" or "implementation" referred to herein means that a particular feature, structure, or feature described in conjunction with the embodiment may be contained in an embodiment of the present disclosure. The phrase appearing in various places in the specification does not necessarily refer to the same embodiment, nor does it refer to an independent or alternative embodiment that is mutually exclusive with other embodiments. It is expressly and implicitly understood by those skilled in the art that an embodiment described herein may be combined with other embodiments. The terms "device", "unit", "system", and the like, as used in the specification, are used to indicate a computer-related entity, hardware, firmware, a combination of hardware and software, software, or software in execution. For example, the device can be, but is not limited to, a processor, a data processing platform, a computing device, a computer, two or more computers, and the like.

Figure 1:
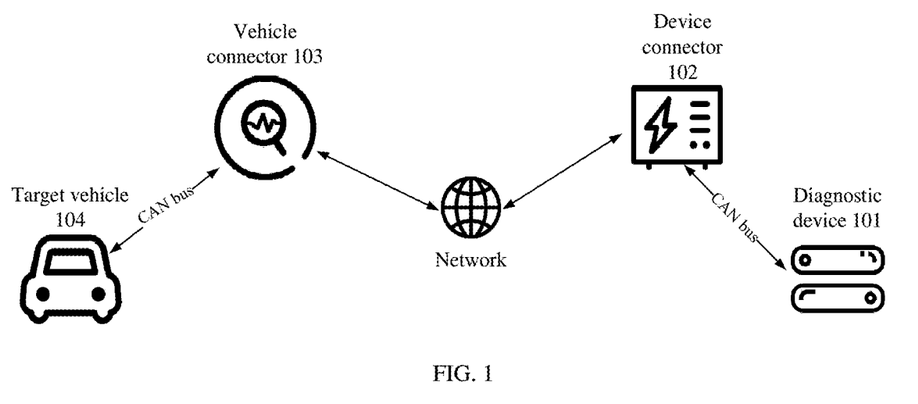
FIG. 1 is a schematic architecture diagram of a system for vehicle remote diagnosis according to an embodiment of the present disclosure.

For a better understanding of a system, a method, a device, and a computer readable storage medium for vehicle remote diagnosis are provided according to the embodiments of the present disclosure. An architecture diagram of the vehicle remote diagnostic system according to the embodiments of the present disclosure is first described below. FIG. 1 is a schematic architecture diagram of a system for vehicle remote diagnosis according to an embodiment of the present disclosure. The vehicle remote diagnostic system includes a diagnostic device 101, a device connector 102, a vehicle connector 103, and a target vehicle 104. The device connector 101 and the diagnostic device 102 perform controller area network (CAN) bus connection via a CAN to communicate with each other. The device connector 102 and the vehicle connector 103 communicate with each other through a network or in other communication manners (for example, wired network connection, server relay, peer-to-peer (P2P) communication). The vehicle connector 103 and the target vehicle 104 perform a CAN bus connection via a CAN to communicate with each other.

The diagnostic device 101 includes but is not limited to various types of vehicle scanning devices such as a handheld device, a personal computer (PC), and the like. A diagnostic database and vehicle type information of the target vehicle 104 are stored in the diagnostic device 101

The device connector 102 has a same pin configuration as the target vehicle 104. The device connector 102 performs the CAN bus connection with the diagnostic device 101, and the device connector 102 is a device with modem and remote communication functions. In the embodiments of the present disclosure, the device connector 102 configures a CAN bus termination resistor, such that a CAN node within the device connector 102 and a CAN node of the diagnostic device 101 form a CAN bus network, and the device connector 102 and the diagnostic device 101 can communicate with each other through the CAN bus network.

The vehicle connector 103 is normally located below an instrument panel and performs the CAN bus connection with the target vehicle 104. The vehicle connector 103 is a device with modem and remote communication functions. Generally, the vehicle connector 103 is provided with 16 pins, each of the 16 pins can communicate with an electronic control unit in the target vehicle 104. In the embodiments of the present disclosure, the vehicle connector 103 configures a CAN bus filter. The CAN bus filter is configured to filter CAN bus messages sent by the electronic control unit in the target vehicle 104 to obtain CAN bus diagnostic messages related to a diagnosis of the target vehicle 104.

At present, network connection manners in the target vehicle 104 mainly adopts two CAN buses including a high-speed CAN bus for drive systems and a low-speed CAN bus for vehicle body systems.

The high-speed CAN bus for drive systems is mainly used for control units such as engines, motors, etc., which require high real-time performance. A rate of data transmission on the high-speed CAN bus is 500 Kbit/s.

The low-speed CAN bus for vehicle body systems is mainly used for vehicle body control such as collection and feedback of signals from vehicle lights, vehicle doors, vehicle windows, etc. A rate of data transmission on the low-speed CAN bus is 100 Kbit/s.

As different controllers in the target vehicle 104 have different performance requirements for the CAN bus, and therefore, the latest version of the CAN bus system is provided with five different parts including a power train CAN bus, a chassis CAN bus, a body CAN bus, an entertainment CAN bus, and a diagnose CAN bus.

The power train CAN bus is mainly used for vehicle power and the highest-level of safety technologies. The power train CAN bus is a CAN bus with the highest-level information priority and highest information transmission rate in a whole vehicle CAN bus network. The power train CAN bus is generally coupled with electronic control units such as an electronic parking system, an electronic airbag system, a battery management system, etc. A rate of data transmission on the power train CAN bus is 500 Kbit/s.

The chassis CAN bus is mainly used for a vehicle chassis and braking/stabilizing/steering of four wheels. The chassis CAN bus is generally coupled with electronic control units such as an antilock brake system, an electronic stability system, an electronic power steering, etc. As the chassis CAN bus involves vehicle braking/power steering, etc., a network signal priority of the chassis CAN bus is also higher. A rate of data transmission on the chassis CAN bus is 100 Kbit/s.

The body CAN bus is mainly used to manage and control intelligent hardware used for improving comfort and safety of a vehicle. The body CAN bus is generally coupled with electronic control units such as an air conditioner, an around view monitor, a body control module such as sunroofs, windows, fog lights, turn lights, wipers, etc., an immobilizer, a tire pressure monitoring system, etc. As the above-mentioned devices are auxiliary devices, a network signal priority of the body CAN bus is lower. A rate of data transmission on the body CAN bus is 100 Kbit/s.

The entertainment CAN bus is mainly used to manage and control some intelligent hardware used for improving entertainment of a vehicle. The entertainment CAN bus is generally coupled with electronic control units such as an in-vehicle entertainment system (that is, a central control system), an instrument pack, etc. Most digital meters today have entertainment functions such as music play function, map function, call function, etc. As the entertainment CAN bus also involves auxiliary devices, a priority of the entertainment CAN bus is also lower. A rate of data transmission on the entertainment CAN bus is 100 Kbit/s.

The diagnose CAN bus mainly provides remote diagnosis function, and is coupled with only one electronic control unit (that is, a remote control unit). A rate of data transmission on the diagnose CAN bus is 500 Kbit/s.

The above-mentioned five kinds of CAN buses are enumerated in the embodiments of the present disclosure, but it does not mean that only or all five kinds of CAN buses are provided on the vehicle. For example, three CAN buses including the power train CAN bus, the body CAN bus, and the entertainment CAN bus are provided in a vehicle of a certain type.

In an embodiment of the present disclosure, the diagnostic device 101 sends a first CAN bus message to the device connector 102. The device connector 102 encapsulates the first CAN bus message received into a first data packet and sends the first data packet to the vehicle connector 103 through remote communication. After the vehicle connector 103 receives the first data packet sent by the device connector 102, the vehicle connector 103 decapsulates the first data packet into the first CAN bus message and sends the first CAN bus message to an electronic control unit of a target vehicle 104, and the vehicle connector 103 and the target vehicle 104 perform a CAN bus connection via a CAN. The vehicle connector 103 receives second CAN bus messages and filters the second CAN bus messages to obtain a CAN bus diagnostic message, and the second CAN bus messages are sent by the electronic control unit of the target vehicle in response to the first CAN bus message. The vehicle connector 103 encapsulates the CAN bus diagnostic message into a second data packet and sends the second data packet to the device connector 102 via the remote communication. The device connector 102 decapsulates the second data packet into the CAN bus diagnostic message and sends the CAN bus diagnostic message to the diagnostic device 101. The diagnostic device 101 analyzes and processes the CAN bus diagnostic message to obtain a diagnostic result, and presents the diagnostic result to a user.

Figure 2:
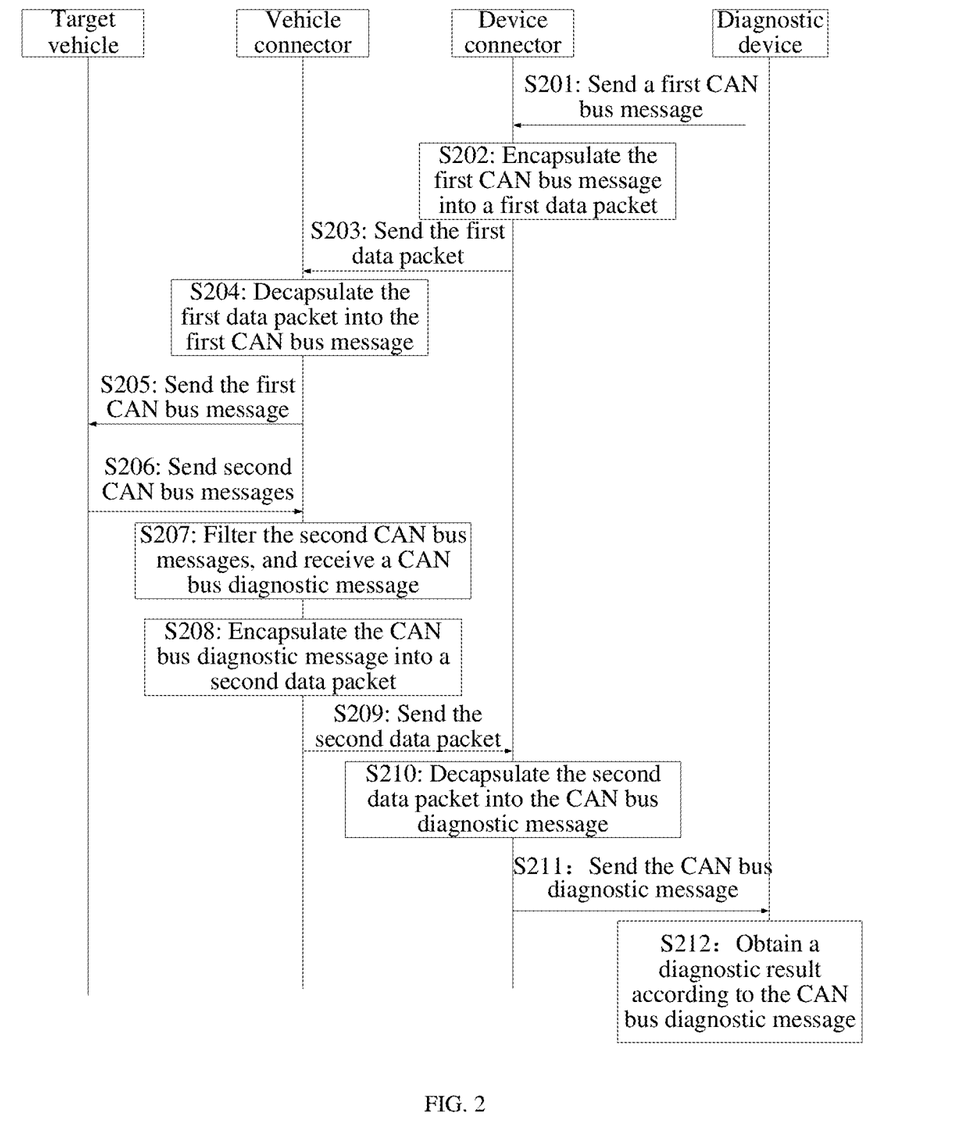
FIG. 2 is a schematic flow chart of a method for performing remote diagnosis according to an embodiment of the present disclosure.

The method for performing vehicle remote diagnosis according to present disclosure will be described below with reference to FIG. 2. FIG. 2 is a schematic flow chart of a method for performing vehicle remote diagnosis according to the embodiments of the present disclosure, and the method can be implemented based on a system architecture illustrated in FIG. 1 or other architectures.

At S201, the diagnostic device 101 sends a first CAN bus message to the device connector 102.

In an implementation, the diagnostic device 101 sends the first CAN bus message to the device connector 102. The device connector 102 can perform the following before receiving the first CAN bus message sent by the diagnostic device 101. Vehicle type information of the target vehicle 104 is obtained. A CAN bus termination resistor is configured according to CAN bus configuration information corresponding to the vehicle type information. The device connector 102 performs a CAN bus connection with the diagnostic device 101. The diagnostic device 101 establishes a communication connection with the device connector 102 through the above operations, and then the diagnostic device 101 can send the first CAN bus message to the device connector 102.

Figure 3:
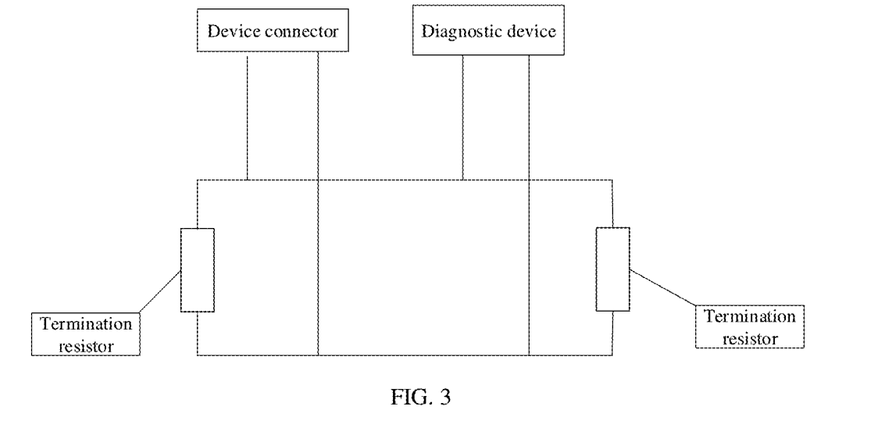
FIG. 3 is a schematic diagram of a topology structure of a device connector and a diagnostic device for performing a CAN bus connection via a CAN according to an embodiment of the present disclosure.
Figure 4:
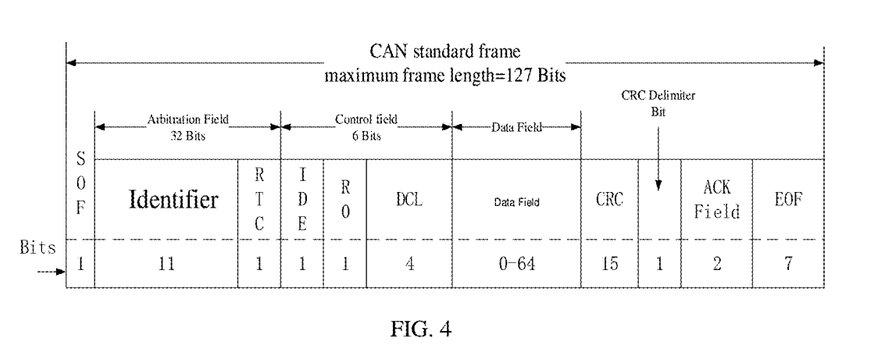
FIG. 4 is a schematic diagram of a CAN bus message format according to an embodiment of the present disclosure.
Figure 5:
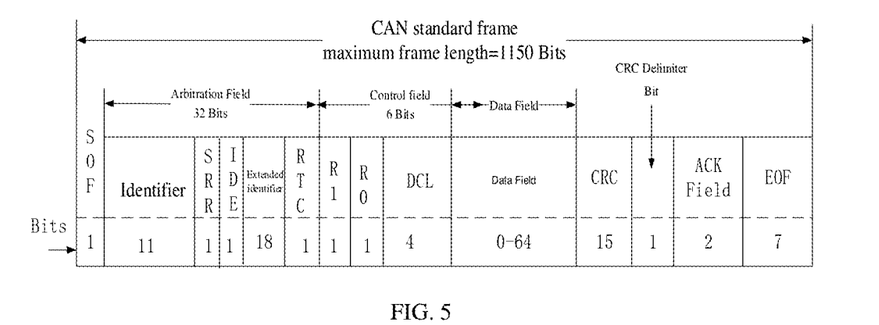
FIG. 5 is a schematic diagram of another CAN bus message format according to an embodiment of the present disclosure.

In an implementation, the device connector 102 determines a target CAN node according to the CAN bus termination resistor configured and builds a CAN bus network by combining the target CAN node and a CAN node of the diagnostic device 101. The diagnostic device 101 performs the CAN bus connection with device connector 102 via a CAN. FIG. 3 illustrates the CAN bus network built by the device connector 102 and the diagnostic device 101 together. In an example, a number of the CAN bus networks built is related to the type information of the target vehicle 104. When the target vehicle 104 is configured with N sets of CAN bus networks, CAN nodes inside the device connector 102 and the CAN nodes of the diagnostic device 101 jointly build N sets of CAN bus networks. For example, when it is determined that the target vehicle 104 is provided with one set of CAN bus network by obtaining the type information of the target vehicle 104, the device connector 102 will configure one set of CAN bus termination resistors to determine the target CAN node, and the target CAN node and the CAN node of the diagnostic device 101 are combined to build one set of CAN bus network. When it is determined that the target vehicle 104 is provided with three sets of CAN bus networks by obtaining the type information of the target vehicle 104, the device connector 102 will configure three sets of CAN bus termination resistors to determine the target CAN nodes, and the target CAN nodes and the CAN nodes of the diagnostic device 101 are combined to build three sets of CAN bus networks. The diagnostic device 101 can send the first CAN bus message to the device connector 102 through the CAN bus network. A message format of the first CAN bus message is illustrated in FIG. 4 or FIG. 5. For example, the first CAN bus message may be a diagnostic request from the user for acquiring failure information of any electronic control unit on the target vehicle 104.

In an implementation, a resistance value of the CAN bus termination resistor is 120 ohms.

In an implementation, the resistance value of the CAN bus termination resistor can be configured to be 60-120 ohms according to the vehicle type information of the target vehicle 104.

In an implementation, the CAN bus network includes various CAN bus networks such as high-speed CAN, fault-tolerant CAN, and single-wire CAN.

At S202, the device connector 102 encapsulates the first CAN bus message into a first data packet.

In an implementation, the device connector 102 receives the first CAN bus message sent by the diagnostic device 101 through the CAN bus network, and encapsulates the first CAN bus message into the first data packet. The first data packet is a data packet suitable for remote communication.

At S203, the device connector 102 sends the first data packet.

In an implementation, the device connector 102 can send the first data packet to the vehicle connector 103 through the remote communication. The remote communication includes but not limited to communication technologies such as server data forwarding, peer-to-peer (P2P) communication, mobile communication, and wired network connection.

At S204, the device connector 102 decapsulates the first data packet into the first CAN bus message.

In an implementation, the vehicle connector 103 receives the first data packet sent by the device connector 102 through the remote communication. The first data packet is obtained by encapsulating the first CAN bus message by the device connector 102. The first CAN bus message is sent by the diagnostic device 101 to the device connector 102, and the first data packet received by the device connector 102 is then decapsulated into the first CAN bus message.

At S205, the vehicle connector 103 sends the first CAN bus message to the electronic control unit of the target vehicle 104.

Figure 6:
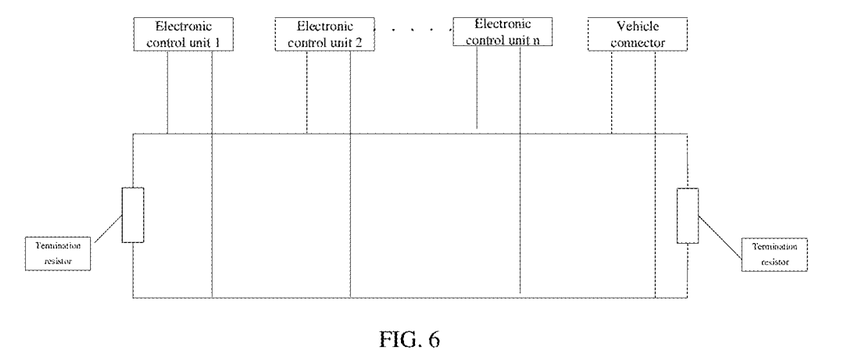
FIG. 6 is a schematic diagram of a topology structure of a vehicle connector and a target vehicle for performing CAN bus connection via a CAN according to an embodiment of the present disclosure.

In an implementation, the vehicle connector 103 and the target vehicle 104 perform the CAN bus connection through the CAN. The vehicle connector 103 can obtain the type information of the target vehicle 104 before the vehicle connector 103 sends the first CAN bus message to the electronic control unit of the target vehicle 104. FIG. 6 is a schematic diagram of a topology structure of the vehicle connector 103 and the target vehicle 104 for performing the CAN bus connection via the CAN. The vehicle connector 103 is connected with multiple CAN bus networks in the target vehicle 104 in a node manner. For example, when the vehicle connector 103 determines that the target vehicle 104 is provided with three CAN bus networks by obtaining the vehicle type information of the target vehicle 104, the vehicle connector 103 is connected to the three CAN bus networks correspondingly. The first CAN bus message is sent to the electronic control unit of the target vehicle 104 via the network, for example, when contents of the first CAN bus message indicate diagnosing a window failure, the vehicle connector 103 sends the first CAN bus message to an electronic control unit of vehicle windows via the body CAN bus.

At S206, the target vehicle 104 sends second CAN bus messages.

In an implementation, the second CAN bus messages are sent to the vehicle connector 103 by the electronic control unit of the target vehicle 104 in response to the first CAN bus message.

At S207, the vehicle connector 103 receives the second CAN bus messages, and further filters the second CAN bus messages to obtain a CAN bus diagnostic message.

In an implementation, the vehicle connector 103 receives the second CAN bus messages sent by the electronic control unit of the target vehicle 104 in response to the first CAN bus message. The vehicle connector 103 can perform the following before the vehicle connector 103 filters the second CAN bus messages to obtain the CAN bus diagnostic message. The vehicle type information of the target vehicle is obtained. A CAN bus filter is configured according to CAN bus configuration information corresponding to the vehicle type information. The vehicle connector 103 performs a CAN bus connection with the target vehicle.

In an implementation, the CAN bus filter of the vehicle connector 103 filters the second CAN bus messages to obtain the CAN bus diagnostic message. In an example, the vehicle connector 103 and the electronic control unit of the target vehicle 104 are connected in a node form on the CAN bus network of the target vehicle 104. Therefore, when a node connected on the CAN bus transmits data, the data is broadcast to all nodes on the network in messages, and each node receives the data regardless of whether the data is sent to each node. Therefore, the CAN bus filter can be configured on the vehicle connector 103 to filter the second CAN bus messages sent by the electronic control unit of the target vehicle 104, and after the CAN bus diagnostic message related to diagnosis of the target vehicle 104 is obtained, the vehicle connector 103 receives the CAN bus diagnostic message. In this implementation, the CAN bus filter is configured according to the CAN bus configuration information corresponding to the vehicle type information of the target vehicle 104. In an example, according to the vehicle type information of the target vehicle 104, it can recognize from the identifiers of a CAN bus message that which identifier(s) of the CAN bus message indicates that this CAN bus message is passable to be received or/and which identifier(s) of the CAN bus message indicates that this CAN bus message is prohibited from passing to be received. This enables the CAN bus filter to be configured to allow which CAN bus message(s) to be passed or/and which CAN bus message(s) to be prohibited from passing. For example, based on the ISO 15031 protocol, a CAN bus message with an 11-bite identifier whose value is in a range from 7DE7E0 to 7DE7EF (hexadecimal) is specified as a diagnostic message, and a CAN bus message with a 19-bite identifier whose value is in a range from 18DA0000 to 18DAFFFF (hexadecimal) is specified as a diagnostic message. Therefore, the CAN bus filter of the vehicle connector 103 is configured to receive CAN bus messages with identifiers whose values are in a range from 7DE7E0 to 7DE7EF or/and 18DA0000 to 18DAFFFF. In another example, a certain type of vehicle specifies that a CAN bus message whose identifier is one of 109000H, 109014H, 109015H, 10A000H, 10A001H, etc., which is prohibited from passing. For another example, when a certain type of vehicle specifies that a CAN bus message whose identifier is one of 109000H, 109014H, 109015H, 10A000H, 10A001H, etc., which is prohibited from passing, a CAN bus filter of a vehicle connector of the vehicle of such type is configured to prohibit from receiving a message whose identifier is one of 109000H, 109014H, 109015H, 10A000H, 10A001H, etc. Since the CAN bus standard merely specifies a physical layer and a data link layer, a vehicle manufacturer can define an application layer by itself, and how the identifier is used in the CAN bus message is specified by the application layer. Since different vehicle manufacturers have different definitions of the application layer, the identifiers of the CAN bus message are also different for different vehicle manufacturers.

At S208, the vehicle connector 103 encapsulates the CAN bus diagnostic message into a second data packet.

In an implementation, the vehicle connector 103 encapsulates the CAN bus diagnostic message received into the second data packet. The second data packet is a data packet suitable for remote communication.

At S209, the vehicle connector 103 sends the second data packet.

In an implementation, the vehicle connector 103 can send the second data packet to the device connector 102 via the remote communication. The remote communication includes but not limited to communication technologies such as server data forwarding, peer-to-peer (P2P) communication, mobile communication, and wired network connection.

At S210, the device connector 102 decapsulates the second data packet into the CAN bus diagnostic message.

In an implementation, the device connector 102 receives the second data packet sent by the vehicle connector 103 through the remote communication, and the second data packet is obtained by encapsulating the CAN bus diagnostic message by the vehicle connector 103. The CAN bus diagnostic message is obtained by filtering the second CAN bus messages by the vehicle connector 103. The second CAN bus messages are obtained from the electronic control unit of the target vehicle 104 in response to the first CAN bus message and are sent to the vehicle connector 103. The device connector 102 decapsulates the second data packet into the CAN bus diagnostic message.

At S211, the device connector 102 sends the CAN bus diagnostic message.

In an implementation, the device connector 102 sends the CAN bus diagnostic message to the diagnostic device 101 via the CAN bus network.

At S212, the diagnostic device 101 obtains a diagnostic result according to the CAN bus diagnostic message.

In an implementation, when received the CAN bus diagnostic message, the diagnostic device 101 analyzes and processes the CAN bus diagnostic message to obtain the diagnostic result and to present the diagnostic result to the user. The user can check fault information through an APP software on a mobile terminal or use a computer terminal to detect a fault condition or to obtain the diagnostic result and the fault repair plan, etc.

The target vehicle 104 and the diagnostic device 101 repeatedly perform remote interaction of CAN bus messages through carrying out operations at S201 to S212, thereby realizing remote diagnosis for the target vehicle 104.

In an embodiment of the present disclosure, the vehicle connector 103 and the electronic control unit of the target vehicle 104 perform the CAN bus connection via the CAN, the device connector 102 and the diagnostic device 101 perform the CAN bus connection via the CAN, and the vehicle connector 103 and the device connector 102 implement data interaction through a network such as the Internet, thereby realizing the remote diagnosis for the target vehicle 104. Furthermore, the CAN bus filter is arranged at a connection end of the target vehicle 104, and the second CAN bus messages received are filtered to obtain the CAN bus diagnostic message related to the diagnosis of the target vehicle 104, thereby realizing efficient diagnosis for the target vehicle 104 and improving the communication efficiency of the vehicle diagnosis.

Figure 7:
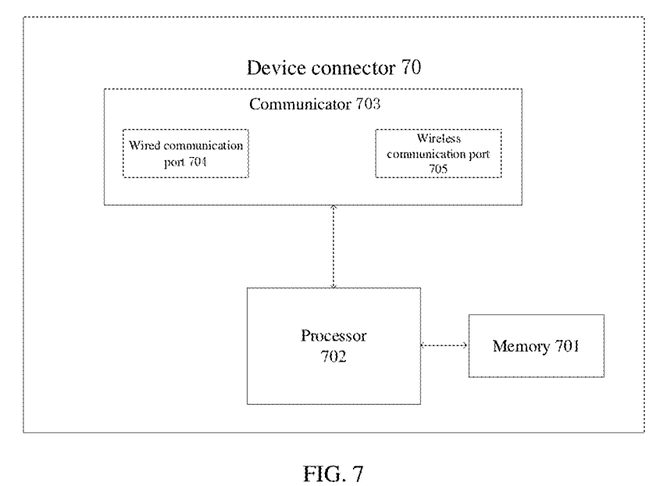
FIG. 7 is a schematic structural diagram of a device connector according to an embodiment of the present disclosure.

FIG. 7 is a schematic structural diagram of a device connector according to an embodiment of the present disclosure. For ease of understanding and illustration, the device connector 70 illustrated in FIG. 7 may include one or more of the following components: a memory 701, a processor 702, and a communicator 703.

The memory 701 may include one or more storage units. Each of the one or more storage units may include one or more storages. The one or more storages can be used to store executable computer programs or to access data. The one or more storages can also access programs or data at high speed and automatically during an operation process of the device connector 70, such that when the programs or data are invoked by the processor 702 to perform methods illustrated in FIG. 2, a first CAN bus message, a first data packet, a second data packet, and other related data, etc. can be stored. Alternatively, the device connector 70 according to an embodiment of the present disclosure may not include the memory 701, and the executable computer programs or data may be accessed in a cloud (i.e., a cloud server). That is, the processor 702 in the device connector 70 can receive computer programs or data stored in the cloud through the communicator 703, such that when the computer programs or data are invoked by the processor 702 to perform the methods illustrated in FIG. 2, the first CAN bus message and other related data, etc. can be stored. In the embodiment of the present disclosure, the device connector 70 includes the memory 701.

The communicator 703 may include a wired communicator (such as a wired network card), and a corresponding wired communication port 704 (for example, a serial port). The communicator 703 may also include a wireless communicator (such as a WiFi module), and a corresponding wireless communication port 705. As illustrated in FIG. 7, the communicator 703 includes the wired communication port 704 and the wireless communication port 705. If communication is performed through a serial port, the device connector 70 can send instructions to a diagnostic device coupled with the serial port through the serial port.

The processor 702 may also be referred to as a processing unit, processing board, a processing device, and the like. The processor 702 can be a central processing unit (CPU), a network processor (NP), or a combination of the CPU and the NP. When the device connector 70 illustrated in FIG. 7 executes operations at S201, S202, S203, S210, and S211 described in method embodiments as illustrated in FIG. 2, the processor 702 invokes the executable computer programs in the memory 701 to carry out the following.

The communicator 703 is configured to receive a first CAN bus message sent by the diagnostic device. The first CAN bus message received is encapsulate into a first data packet and the first data packet is sent to a vehicle connector through the communicator 703. The first data packet is decapsulated by the vehicle connector into the first CAN bus message and the first CAN bus message is further sent by the vehicle connector to an electronic control unit of a target vehicle, and the vehicle connector and the target vehicle perform a CAN bus connection via a CAN. The communicator 703 is configured to receive a second data packet sent by the vehicle connector through remote communication. The second data packet is obtained by encapsulating a CAN bus diagnostic message by the vehicle connector. The CAN bus diagnostic message is obtained by filtering second CAN bus messages by the vehicle connector. The second CAN bus messages are sent by the electronic control unit of the target vehicle to the vehicle connector in response to the first CAN bus message.

The second data packet is decapsulated into the CAN bus diagnostic message and the CAN bus diagnostic message is sent to the diagnostic device through the communicator. The CAN bus diagnostic message is analyzed and processed by the diagnostic device to obtain a diagnostic result, and the diagnostic result is presented to a user by the diagnostic device.

In an embodiment, the communicator 703 is further configured to perform the following prior to receiving the first CAN bus message sent by the diagnostic device. The communicator 703 is configured to obtain vehicle type information of the target vehicle. The processor 702 is configured to configure a CAN bus termination resistor according to CAN bus configuration information. The communicator 703 is configured to perform a CAN bus connection with the diagnostic device.

In an embodiment, the communicator 703 and the diagnostic device perform the CAN bus connection as follows. A target CAN node is determined according to the CAN bus termination resistor configured. The CAN bus connection with the diagnostic device is performed through the communicator 703. A CAN bus network is built by combining the target CAN node and a CAN node of the diagnostic device.

It is noted that functions of functional units in the device illustrated in FIG. 7 according to the embodiments of the present disclosure, reference may be made to operations carried out at S201, S202, S203, S210, and S211 described in the method embodiments illustrated in FIG. 2, and details are not described herein again.

Figure 8:
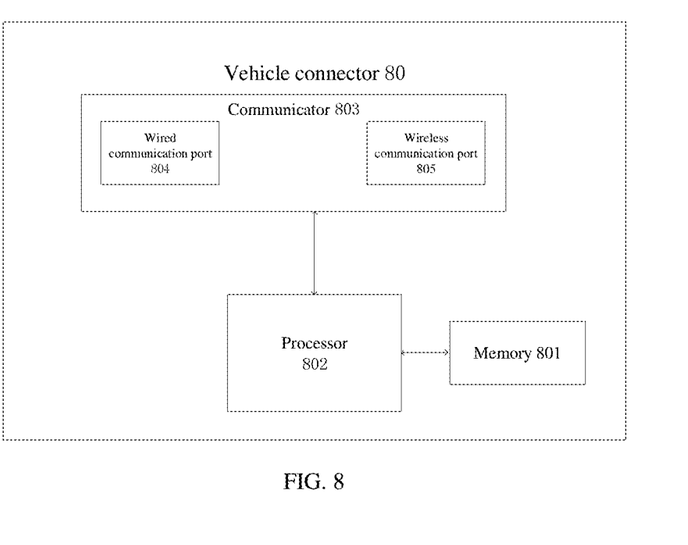
FIG. 8 is a schematic structural diagram of a vehicle connector according to an embodiment of the present disclosure.

FIG. 8 is a schematic structural diagram of a vehicle connector according to an embodiment of the present disclosure. For ease of understanding and illustration, the vehicle connector 80 illustrated in FIG. 8 may include one or more of the following components: a memory 801, a processor 802, and a communicator 803.

The memory 801 may include one or more storage units. Each of the one or more storage units may include one or more storages. The one or more storages can be used to store executable computer programs or to access data. The one or more storages can also access programs or data at high speed and automatically during an operation process of the vehicle connector 80, such that when the programs or data are invoked by the processor 802 to perform methods illustrated in FIG. 2, a first CAN bus message, a first data packet, a second data packet, and other related data, etc. can be stored. Alternatively, the vehicle connector 80 according to an embodiment of the present disclosure may not include the memory 801, and the executable computer programs or data may be accessed in a cloud (i.e., a cloud server). That is, the processor 802 in the device connector 80 can receive computer programs or data stored in the cloud through the communicator 803, such that when the computer programs or data are invoked by the processor 802 to perform the methods illustrated in FIG. 2, the first CAN bus message and other related data, etc. can be stored. In the embodiment of the present disclosure, the vehicle connector 80 includes the memory 801.

The communicator 803 may include a wired communicator (such as a wired network card), and may include a corresponding wired communication port 804 (for example, a serial port). The communicator 803 may also include a wireless communicator (such as a WiFi module), and may include a corresponding wireless communication port 805. As illustrated in FIG. 8, the communicator 803 includes the wired communication port 804 and the wireless communication port 805. If communication is performed through a serial port, the vehicle connector 80 can send instructions to a diagnostic device coupled with the serial port through the serial port.

The processor 802 may also be referred to as a processing unit, processing board, a processing device, and the like. The processor 802 can be a central processing unit (CPU), a network processor (NP), or a combination of the CPU and the NP. When the vehicle connector 80 illustrated in FIG. 8 executes operations at S204, S205, S207, S208, and S209 described in method embodiments as illustrated in FIG. 2, the processor 802 invokes the executable computer programs in the memory 801 to carry out the following.

The communicator 803 is configured to receive a first data packet sent by a device connector 80 through remote communication. The first data packet is obtained by encapsulating a first CAN bus message by the device connector 80, and the first CAN bus message is sent by a diagnostic device to the device connector 80.

The first data packet is decapsulated into the first CAN bus message and the first CAN bus message is sent to an electronic control unit of a target vehicle, and the vehicle connector 80 and the target vehicle perform a CAN bus connection via a CAN.

The communicator 803 is configured to receive second CAN bus messages and to filter the second CAN bus messages to obtain a CAN bus diagnostic message, and the second CAN bus messages are sent by the electronic control unit of the target vehicle in response to the first CAN bus message.

The CAN bus diagnostic message is encapsulated into a second data packet and the second data packet is sent to the device connector 80 via the communicator 803. The second data packet is decapsulated by the device connector 80 into the CAN bus diagnostic message and the CAN bus diagnostic message is further sent by the device connector 80 to the diagnostic device, and the CAN bus diagnostic message is analyzed and processed by the diagnostic device to obtain a diagnostic result, and the diagnostic result is presented to a user by the diagnostic device.

In an implementation, the processor 802 further includes the following prior to filtering the second CAN bus messages to obtain the CAN bus diagnostic message.

Vehicle type information of the target vehicle is obtained through the communicator 803. A CAN bus filter is configured according to CAN bus configuration information corresponding to the vehicle type information. A CAN bus connection with the target vehicle is performed through the communicator 803.

In an embodiment, the second CAN bus messages is filtered to obtain the CAN bus diagnostic message as follows.

The CAN bus filter filters the second CAN bus messages to obtain the CAN bus diagnostic message.

It is noted that functions of functional units in the device illustrated in FIG. 8 according to the embodiments of the present disclosure, reference may be made to operations carried out at S204, S205, S207, S208, and S209 described in the method embodiments illustrated in FIG. 2, and details are not described herein again.

Those of ordinary skill in the art may understand that all or part of the operations in the methods described in the foregoing embodiments may be implemented by a program instructing relevant hardware. The program may be stored in a computer-readable storage medium. When the program is executed, the operations in the embodiments of the above-mentioned methods can be performed. The foregoing storage medium may include a magnetic disk, an optical disk, a read only memory (ROM), a random access memory (RAM), or the like.

The units described as separate components could or could not be physically separate, the components illustrated as units could or could not be physical units, which can be located in one place, or can be distributed to multiple network units. Parts or all of the units could be selected according to the actual needs to achieve an object of the embodiments according to the present disclosure.

In addition, the various functional units in each of the embodiments of the present disclosure can be integrated into a single processing unit, or exist individually and physically, or two or more than two units are integrated into a single unit. The aforesaid integrated unit can either be achieved by hardware, or be achieved in the form of software functional units.

While the present disclosure has been described in detail above with reference to the exemplary embodiments, the scope of the present disclosure is not limited thereto. As will occur to those skilled in the art, the present disclosure is susceptible to various modifications and substitutions without departing from the technical scope of the present disclosure. Therefore, the scope of the present disclosure should be determined by the scope of the claims.

It is noted that, values of serial numbers of the aforesaid steps don't mean a sequencing of execution sequences, the execution sequence of each of the steps should be determined by functionalities and internal logics of the steps themselves, and shouldn't be regarded as limitation to an implementation process of the embodiments of the present disclosure. However, other variations of the disclosed embodiments can be appreciated and implemented by those skilled in the art.

What is claimed is:

1. A method for performing vehicle remote diagnosis, applicable to a device connector, wherein the method comprises:

receiving a first CAN bus message sent by a diagnostic device;

encapsulating the first CAN bus message received into a first data packet and sending the first data packet to a vehicle connector through remote communication, wherein the first data packet is decapsulated by the vehicle connector into the first CAN bus message and the first CAN bus message is further sent by the vehicle connector to an electronic control unit of a target vehicle, and wherein the vehicle connector and the target vehicle perform a CAN bus connection via a CAN;

receiving a second data packet sent by the vehicle connector through the remote communication, wherein the second data packet is obtained by encapsulating a CAN bus diagnostic message by the vehicle connector, and wherein the CAN bus diagnostic message is obtained by filtering second CAN bus messages by the vehicle connector, and wherein the second CAN bus messages are sent by the electronic control unit of the target vehicle to the vehicle connector in response to the first CAN bus message; and decapsulating the second data packet into the CAN bus diagnostic message and sending the CAN bus diagnostic message to the diagnostic device, wherein the CAN bus diagnostic message is analyzed and processed by the diagnostic device to obtain a diagnostic result, and the diagnostic result is presented to a user by the diagnostic device, wherein the method further comprises the following prior to receiving the first CAN bus message sent by the diagnostic device:

obtaining vehicle type information of the target vehicle;

configuring a CAN bus termination resistor according to CAN bus configuration information corresponding to the vehicle type information; and performing a CAN bus connection with the diagnostic device.

2. The method of claim 1, wherein performing the CAN bus connection with the diagnostic device comprises:

determining a target CAN node according to the CAN bus termination resistor configured; and building a CAN bus network by combining the target CAN node and a CAN node of the diagnostic device, and performing the CAN bus connection with the diagnostic device.

3. The method of claim 1, wherein the remote communication comprises server data forwarding, peer-to-peer (P2P) communication, and mobile communication.

4. The method of claim 1, wherein the remote communication comprises server data forwarding, peer-to-peer (P2P) communication, and mobile communication.

5. The method of claim 2, wherein the remote communication comprises server data forwarding, peer-to-peer (P2P) communication, and mobile communication.

6. A method for performing vehicle remote diagnosis, applicable to a vehicle connector, wherein the method comprises:

receiving a first data packet sent by a device connector through remote communication, wherein the first data packet is obtained by encapsulating a first CAN bus message by the device connector, and wherein the first CAN bus message is sent by a diagnostic device to the device connector;

decapsulating the first data packet into the first CAN bus message and sending the first CAN bus message to an electronic control unit of a target vehicle, wherein the vehicle connector and the target vehicle perform a CAN bus connection via a CAN;

receiving second CAN bus messages and filtering the second CAN bus messages to obtain a CAN bus diagnostic message, wherein the second CAN bus messages are sent by the electronic control unit of the target vehicle in response to the first CAN bus message; and encapsulating the CAN bus diagnostic message into a second data packet and sending the second data packet to the device connector via the remote communication, wherein the second data packet is decapsulated by the device connector into the CAN bus diagnostic message and the CAN bus diagnostic message is further sent by the device connector to the diagnostic device, and wherein the CAN bus diagnostic message is analyzed and processed by the diagnostic device to obtain a diagnostic result, and the diagnostic result is presented to a user by the diagnostic device, wherein the method further comprises the following prior to filtering the second CAN bus messages to obtain the CAN bus diagnostic message:

obtaining vehicle type information of the target vehicle;

configuring a CAN bus filter according to CAN bus configuration information corresponding to the vehicle type information; and performing a CAN bus connection with the target vehicle.

7. The method of claim 6, wherein filtering the second CAN bus messages to obtain the CAN bus diagnostic message comprises:

filtering the second CAN bus messages to obtain the CAN bus diagnostic message according to the CAN bus filter.

8. The method of claim 6, wherein the remote communication comprises server data forwarding, peer-to-peer (P2P) communication, and mobile communication.

9. The method of claim 6, wherein the remote communication comprises server data forwarding, peer-to-peer (P2P) communication, and mobile communication.

10. A device connector, comprising:

a communicator configured to receive a first CAN bus message sent by a diagnostic device; and a processor configured to encapsulate the first CAN bus message received into a first data packet and to send the first data packet to a vehicle connector through the communicator according to stored executable computer programs, wherein the first data packet is decapsulated by the vehicle connector into the first CAN bus message and the first CAN bus message is further sent by the vehicle connector to an electronic control unit of a target vehicle, and wherein the vehicle connector and the target vehicle perform a CAN bus connection via a CAN;

wherein the communicator is further configured to receive a second data packet sent by the vehicle connector through remote communication, wherein the second data packet is obtained by encapsulating a CAN bus diagnostic message by the vehicle connector, and wherein the CAN bus diagnostic message is obtained by filtering second CAN bus messages by the vehicle connector, and wherein the second CAN bus messages are sent by the electronic control unit of the target vehicle to the vehicle connector in response to the first CAN bus message;

wherein the processor is further configured to decapsulate the second data packet into the CAN bus diagnostic message and to send the CAN bus diagnostic message to the diagnostic device through the communicator according to the stored executable computer programs, and wherein the CAN bus diagnostic message is analyzed and processed by the diagnostic device to obtain a diagnostic result, and the diagnostic result is presented to a user by the diagnostic device;

wherein the communicator is configured to obtain vehicle type information of the target vehicle;

wherein the processor is configured to configure a CAN bus termination resistor according to CAN bus configuration information corresponding to the vehicle type information and the stored executable computer programs; and wherein the communicator is further configured to perform a CAN bus connection with the diagnostic device.

11. The device connector of claim 10, wherein:

the processor is configured to determine a target CAN node according to the CAN bus termination resistor configured and the stored executable computer programs; and the communicator is configured to build a CAN bus network by combining the target CAN node and a CAN node of the diagnostic device, and to perform the CAN bus connection with the diagnostic device.

12. The device connector of claim 10, wherein the remote communication comprises server data forwarding, peer-to-peer (P2P) communication, and mobile communication.

13. A vehicle connector, comprising:
a communicator configured to receive a first data packet sent by a device connector through remote communication, wherein the first data packet is obtained by encapsulating a first CAN bus message by the device connector, and wherein the first CAN bus message is sent by a diagnostic device to the device connector; and
a processor configured to decapsulate the first data packet into the first CAN bus message and to send the first CAN bus message to an electronic control unit of a target vehicle according to stored executable computer programs, wherein the vehicle connector and the target vehicle perform a CAN bus connection via a CAN;
wherein the communicator is further configured to receive second CAN bus messages and to filter the second CAN bus messages by the processor to obtain a CAN bus diagnostic message,
wherein the second CAN bus messages are sent by the electronic control unit of the target vehicle in response to the first CAN bus message;
wherein the processor is further configured to encapsulate the CAN bus diagnostic message into a second data packet and to send the second data packet to the device connector via the communicator according to the stored executable computer programs, wherein the second data packet is decapsulated by the device connector into the CAN bus diagnostic message and the CAN bus diagnostic message is further sent by the device connector to the diagnostic device, and wherein the CAN bus diagnostic message is analyzed and processed by the diagnostic device to obtain a diagnostic result, and the diagnostic result is presented to a user by the diagnostic device;
wherein the communicator is configured to obtain vehicle type information of the target vehicle;
wherein the processor is configured to configure a CAN bus filter according to CAN bus configuration information corresponding to the vehicle type information and the stored executable computer programs; and
wherein the communicator is configured to perform a CAN bus connection with the target vehicle.

14. The vehicle connector of claim 13, wherein:
the processor is configured to filter the second CAN bus messages to obtain the CAN bus diagnostic message according to the CAN bus filter and the stored executable computer programs.

15. The vehicle connector of claim 13, wherein the remote communication comprises server data forwarding, peer-to-peer (P2P) communication, and mobile communication.

16. The vehicle connector of claim 13, wherein the remote communication comprises server data forwarding, peer-to-peer (P2P) communication, and mobile communication.

* * * * *